May 2, 1939.  H. R. MINOR  2,156,508
PROCESS OF MAKING SPONGE RUBBER
Filed May 16, 1936
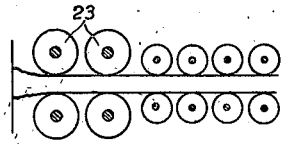
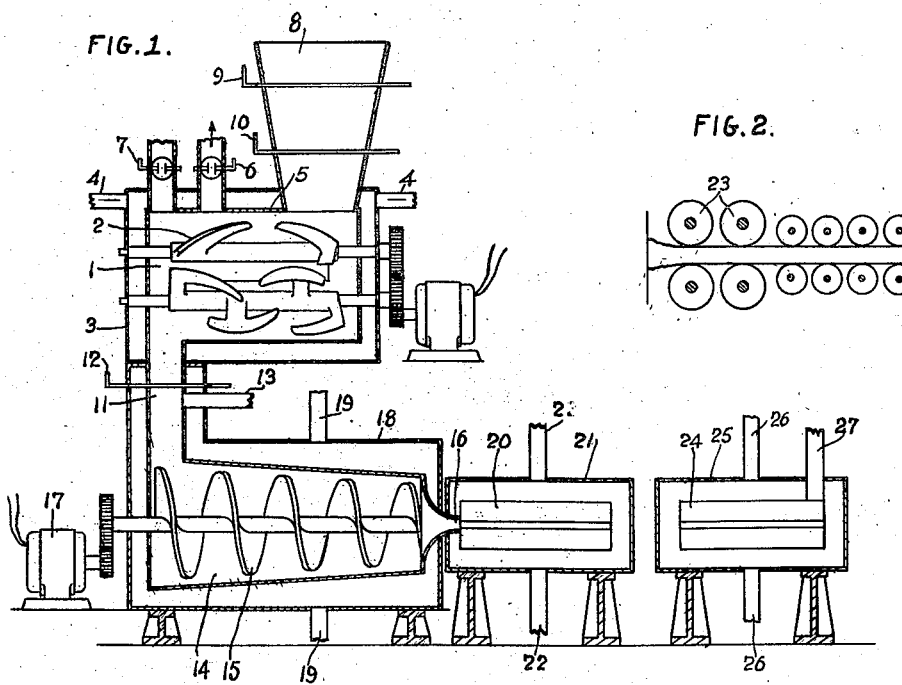
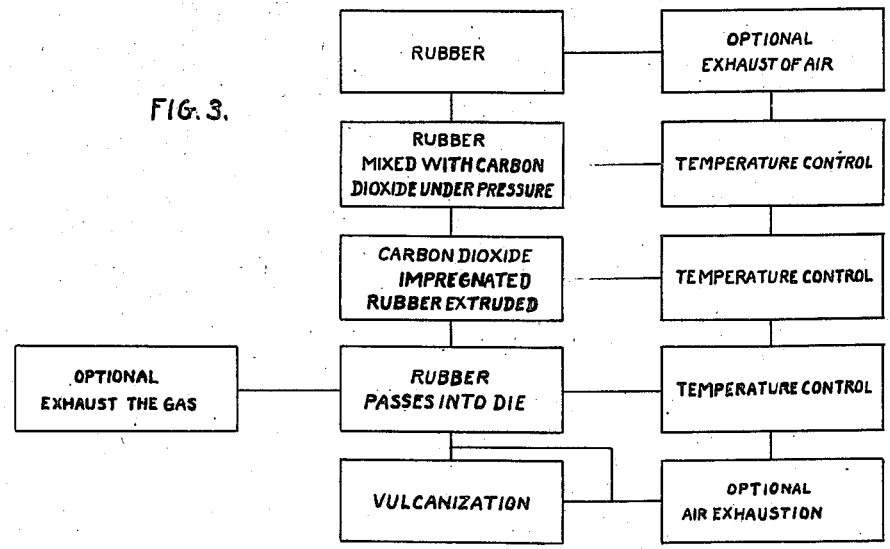
HENRY R. MINOR, Inventor Patented May 2, 1939

2,156,508

UNITED STATES PATENT OFFICE 2,156,508

PROCESS OF MAKING SPONGE RUBBER

Henry R. Minor, Dayton, Ohio, assignor to Industrial Process Corporation, Dayton, Ohio, a corporation of New York Application May 16, 1936, Serial No. 80,190

6 Claims. (Cl. 18—53)

My invention relates to the making of sponge rubber.

It is the object of my invention to provide a process and an apparatus for making sponge rubber in which the rubber is impregnated with carbon dioxide gas, is then extruded as gas impregnated rubber into a predetermined form or configuration, and thereafter it is expanded and its shape finally fixed by the vulcanization of the rubber.

It is the object of my invention to mill the rubber in the presence of carbon dioxide gas in a closed container to accelerate the incorporation of carbon dioxide gas in the rubber; and thereafter to extrude the impregnated rubber in the presence of carbon dioxide gas either into an open mold or into a closed mold. If it is extruded into an open mold, it can be permitted to stay in the open mold the length of time necessary to regulate the loss of the gas in the rubber as desired. Thereafter, it is delivered to the final mold where heat is applied; further expansion takes place to the extent desired, and the rubber is vulcanized to its final form as sponge rubber.

It is a further object to control the temperature of the rubber during the incorporation of the carbon dioxide gas either at or during the extrusion of the rubber. The rate of expansion and loss of the gas are controlled by the temperature to which the rubber is subjected upon the completion of the mixing.

It is a further object of my invention to provide for exhausting the air from the rubber as it is milled and thereafter subjecting the rubber to an atmosphere of carbon dioxide gas, preferably under pressure, while it is being milled.

It is a further object to provide an addition of carbon dioxide gas after it is milled and during its extrusion.

It is an object to control the temperature of the extruded rubber prior to its introduction into the vulcanizing mold or before the steam is applied in the vulcanizer after it has been placed in the vulcanizer.

Optionally, the rubber batch may be impregnated with carbon dioxide under high pressure by mixing it in a pressure mixer consisting of an autoclave having mechanical means for mixing the rubber in the interior compartment thereof. After being thus carbonated or impregnated, the stock may then be extruded through a die of the desired shape, the extruder meanwhile being preferably cooled externally so as to cause the extruded stock to be at a temperature such that the expansion, due to the contained gas pressure, will be withheld prior to the placing of the rubber batch in the molds, and prior to the actual curing thereof.

When the rubber impregnated batch is placed in the vulcanizer molds, the release of gas therefrom and the vulcanization thereof can be carried out by any desired method, but preferably according to that set forth in my co-pending application, Serial Number 59,625, filed January 17, 1936.

Referring to the drawing:

Figure 1 is a diagram illustrating the mechanism for practicing the successive steps of my invention.

Figure 2 is an alternative view showing the alternative method of controlling the thickness of sheets of rubber after being impregnated with carbon dioxide gas, the sheet being shown in a vertical position so that it can be delivered to the mold in a vertical position for expansion and vulcanization.

Figure 3 is a flow sheet diagram showing the successive steps of the process.

Referring to the drawing in detail, 1 designates a mixing chamber having a mixer 2. This chamber is optionally jacketed as at 3 to control the temperature of the gas and rubber inside of the mixer. The pipes 4 indicate pipes for water or steam for controlling the temperature. The cover of the mixer designated 5 is provided with an exhaust pipe 6 which may be connected to a vacuum pump for exhausting the air from the rubber and from the mixer. Pipe 7 is for the purpose of supplying carbon dioxide under pressure from a suitable source of supply. The hopper 8 is provided with the dual slides 9 and 10 for introducing additional amounts of rubber while still maintaining the vacuum or pressure conditions within the mixer 1. The rubber is discharged in its impregnated condition through the pipe 11 controlled by the slide 12. Additional carbon dioxide gas may be supplied at this point through the pipe 13.

The impregnated rubber passes into the extrusion chamber 14 having an extruding auger 15 which forces the rubber out through the die opening 16. The auger is driven by the motor 17. The extrusion casing may have its temperature controlled by the jacket 18 and fluid or steam pipes 19, which can be used either for heating or cooling fluids or gases. The extruded, impregnated rubber then passes through a temperature controlled die 20 which has a jacket 21 with supply pipes for gas or fluid, the pipes being designated 22. This gas or the fluid will control the temperature of the die and rubber within the die.

Alternatively, as shown in Figure 2, in place of the die, the rubber may be extruded between rolls 23 so that it can be delivered in sheets, preferably vertically, so as to be inserted within the vulcanizing mold 24, which has the usual steam jacket 25 and steam pipes 26. If desired, after extrusion and before placing in the vulcanizer, the impregnated rubber may be exposed to the air and gas allowed to escape for a predetermined period to further control the expansion of the rubber due to the expansion of the gas. When the product is finally vulcanized, it is delivered in the form of a vulcanizing mold and in a sponge condition.

By following this process, the rubber can be controlled as to its gaseous content and therefore as to its rate of expansion. It can be brought to shape continuously by the extruding mechanism and the die and can be vulcanized in that shape with a controlled sponge condition.

It is preferred to control the temperature of the rubber in the extruder by cooling it externally so as to cause the extruded stock to be at a temperature such that the expansion due to the contained gas pressure will be held at a predetermined point prior to placing in the mold and actually curing.

It will be understood, of course, that the rubber introduced into the pressure mixer will be uncured compounded stock.

It will be further understood that instead of pressure being applied or pressure being maintained after the stock has been extruded through the die, the rubber may be subjected, temporarily, to a vacuum to further control and accelerate the expansion of the rubber. This is optional.

After the rubber is treated and supplied in its impregnated state to the vulcanizer, the process thereafter should preferably follow that set forth in my co-pending application Serial No. 59,625, filed January 17, 1936.

As disclosed in this co-pending application, I have invented a process in which the gas pressure is increased as the temperature increases and then the gas is released while the temperature continues to increase to bring about final curing and vulcanization. The pipes 27 in connection with the vulcanizer 25 are used for controlling the release of gas pressure in the impregnated rubber as the temperature increases due to the application of steam through the pipes 26. Thus it is possible to control at all stages the expansion of the rubber.

The mold used in connection with the vulcanizing of rubber I have found can be made of sheet metal. By controlling the external and internal pressures of the sheet metal mold and maintaining them in substantial equilibrium, I am able to use a simple and inexpensive mold of such material.

For instance, 18 gauge steel may be stamped or cut in the desired shape to form the molds. Molds of this character could not be used heretofore and have never been suggested because they would be impractical for use with chemical sponge rubber or for molded articles of other kinds due to the fact that only in this process is there equilibrium of gas pressures, both within and without, maintained throughout both the impregnation and curing periods.

I desire to comprehend within my invention such modifications as may be embraced within my claims and the scope of my invention.

Having thus fully described my invention, what I claim as new and desire to secure by Letters Patent, is:

1. A process of making sponge rubber comprising exposing the rubber batch to impregnation by carbon dioxide gas under a pressure sufficiently high to cause the gas to enter the rubber, extruding the gas-impregnated rubber through a die of predetermined configuration while maintaining the carbon dioxide content in the rubber substantially constant, cooling the rubber during extrusion to retard the premature expansion thereof, and after extrusion applying heat to expand and fix the shape of the extruded rubber prior to the vulcanization thereof.

2. In a process of making sponge rubber, the steps of (a) working uncured rubber stock in the presence of carbon dioxide gas under pressure to impregnate it; (b) delivering it to an extrusion chamber and extruding it while maintaining carbon dioxide gas in the extrusion chamber under pressure to inhibit substantial release of carbon dioxide from the rubber; (c) controlling the temperature of the rubber during extrusion; and (d) vulcanizing the rubber.

3. In a process of making sponge rubber, the steps of (a) working the rubber in the presence of carbon dioxide gas to thoroughly impregnate it with carbon dioxide; (b) extruding the gas impregnated rubber without substantially lowering the content of carbon dioxide gas in the rubber; (c) releasing carbon dioxide gas from the rubber to control the expansion of the rubber; and (d) vulcanizing the impregnated rubber while controlling the escape of the carbon dioxide gas during vulcanization to control the character of the sponge rubber.

4. In a process of making sponge rubber, the steps of (a) mixing uncured rubber stock in the presence of carbon dioxide under pressure to impregnate it; (b) extruding the impregnated rubber into a predetermined shape while maintaining the rubber in contact with carbon dioxide under pressure; (c) placing the rubber in a vulcanizing mold; (d) controlling the temperature and the rate of release of the gas in the rubber while in the vulcanizing mold to control the character of the sponge so formed; and (e) applying heat for regulating the expansion of the gas and for vulcanizing the impregnated rubber to form sponge rubber of a predetermined size and form.

5. In a process of making sponge rubber, (a) mixing uncured rubber stock in the presence of carbon dioxide gas under pressure; (b) extruding the impregnated stock while maintaining the gas in the rubber; (c) controlling the temperature of the extruded stock; (d) placing the extruded impregnated stock in a curing and vulcanizing mold; (e) controlling the rate of escape of the gas from the impregnated stock while applying heat thereto; and (f) vulcanizing the stock in a predetermined form after the gas therein has expanded the rubber to a predetermined size.

6. A process of making sponge rubber, comprising the steps of (a) introducing carbon dioxide into rubber by direct gas impregnation, (b) transferring the gas impregnated rubber into an extruder without substantial loss of gas, and (c) extruding the rubber into the desired form while controlling its expansion.

HENRY R. MINOR.